United States Patent [19]

Spitzer

[11] Patent Number: 5,237,036
[45] Date of Patent: Aug. 17, 1993

[54] POLYOL COMPONENTS FOR THE PRODUCTION OF POLYURETHANE MOULDINGS

[75] Inventor: Martin Spitzer, Ehrenkirchen-Norsingen, Fed. Rep. of Germany

[73] Assignee: Ciba-Geigy Corporation, Ardsley, N.Y.

[21] Appl. No.: 875,880

[22] Filed: Apr. 29, 1992

[30] Foreign Application Priority Data

May 3, 1991 [CH] Switzerland ............ 1324/91-1

[51] Int. Cl.$^5$ ............................................ C08G 18/48
[52] U.S. Cl. ........................................ 528/67; 528/76; 528/77; 528/54; 521/176; 521/914; 252/182.25
[58] Field of Search ............... 252/182.25; 528/67, 528/76, 77, 54; 521/176, 914

[56] References Cited

U.S. PATENT DOCUMENTS

| | | | |
|---|---|---|---|
| 3,772,221 | 11/1973 | Hostettler et al. | 521/51 |
| 3,836,487 | 9/1974 | Carter | 521/51 |
| 3,993,576 | 11/1976 | Barron | 252/182 |
| 4,826,885 | 5/1989 | Tsai | 521/176 |
| 5,028,684 | 7/1991 | Neuhaus et al. | 528/77 |

*Primary Examiner*—John Kight, III
*Assistant Examiner*—Rachel Johnson
*Attorney, Agent, or Firm*—William A. Teoli, Jr.

[57] ABSTRACT

The invention relates to polyol components, in particular for reaction with polyisocyanates of the diphenylmethane series, which comprise a) a polyol having a hydroxyl equivalent weight of up to 150 and a functionality of 4 to 8, b) a polyether-polyol having a hydroxyl equivalent weight of more than 1900 and a functionality of 2 to 4 and c) a polypropylene glycol having a functionality of 2 to 3, a polytetrahydrofuran, each of which has a hydroxyl equivalent weight of 150 to 500, or a mixture of the two. The polyol components are distinguished by a low tendency to demix, even during prolonged storage. Reaction mixtures of the polyol components described and polyisocyanates of the diphenylmethane series cure fully without passing through a brittle phase. The mouldings formed have good mechanical properties.

13 Claims, No Drawings

POLYOL COMPONENTS FOR THE PRODUCTION OF POLYURETHANE MOULDINGS

The invention relates to a polyol component, in particular for reaction with polyisocyanates of the diphenylmethane series, reaction mixtures comprising the polyol components mentioned and polyisocyanates, a process for the production of polyurethane mouldings using these reaction mixtures and polyurethane mouldings obtainable from the reaction mixtures described.

At present, the production of polyurethane mouldings from a polyisocyanate and polyol component is carried out in practice with almost exclusively polyisocyanates from the diphenylmethane series. The polyol component often comprises a mixture of two or more different polyols to control the properties of the polyurethane material, it being possible for the polyols to differ to a greater or lesser degree, for example in their functionality and in their molecular weight. Depending on the composition of the polyol mixture, for example, the mechanical or thermal properties of polyurethane mouldings can thus be controlled, as well as the maximum processing time of the reaction mixture of the polyisocyanate and polyol component and the course of the full curing of the mixture. Mixtures which comprise at least one low molecular weight and one long-chain polyol, for example, are often employed. Amongst other things, the low molecular weight polyol increases the hardness of the polyurethane material, and the long-chain polyol its toughness. The composition of a polyol component of course also has an effect on the intrinsic properties thereof, for example its shelf life. For the reasons mentioned, many different polyol compositions have already been described for the preparation of polyurethane materials.

For example, a polyol composition which is particularly stable toward demixing and therefore has a good shelf life is known from U.S. Pat. No. 3,993,576. It contains 5 to 50% by weight of a low molecular weight polyol chosen from a group which comprises certain diols and glycerol, 50 to 95% by weight of a long-chain polyol having a functionality of 2 to 4 and a hydroxyl equivalent weight of between 650 and 3000 (corresponding to a molecular weight of between 1300 and 12,000), and a third polyol, namely a polypropylene glycol or poly-(1,2-butylene glycol), having a hydroxyl equivalent weight of up to about 80 (corresponding to a molecular weight of up to about 160). As a rule, no polyurethane mouldings having a modulus of elasticity in bending of more than 1000 N/mm$^2$ can be prepared from a reaction mixture which consists of a polyisocyanate of the diphenylmethane series and one of the polyol components mentioned without further reinforcing additions, for example of fibre materials. Reaction mixtures comprising a low molecular weight polyol of low functionality moreover pass through an extended brittle phase during curing.

The brittle phase mentioned is a time phase during which, although the moulding freshly formed from the liquid reaction mixture is already in the solid state, so that it could be removed from the mould, the moulding is still very brittle. The occurrence of a brittle phase during production of polyurethane mouldings is a problem which occurs frequently when reaction mixtures based on polyisocyanates of the diphenylmethane series and polyol components of the prior art are used. Relatively long brittle phases, for example starting a few minutes after the components have been brought together and lasting up to several hours, depending on the reactivity of the reaction mixture, occur in particular if full curing of the mixture is carried out at room temperature or only moderately elevated temperature. This applies especially to polyurethane material which is prepared with the aid of low molecular weight polyols. The duration of the brittle phase is in general longer, the longer the pot life of the polyisocyanate and polyol reaction mixture used. The brittle phase is as a rule considerably longer than the time needed to convert the reaction mixture into the solid state. The brittle phase is therefore a particular disadvantage, because removal from the mould during this period of time can easily cause destruction of the moulding, since the mouldings often have to be subjected to relatively severe mechanical stress during this operation. Even after removal from the mould, the mouldings still have to be treated relatively carefully up until the end of the brittle phase, so that they are not damaged.

Another storage stable polyol blend is known from U.S. Pat. No. 4,826,885. It comprises a short-chain diol, a polyoxypropylen triol having a molecular weight of between 2000 and 8000, and a polyoxypropylen triol having a molecular weight of between 300 and 900, said blend being substantially devoid of polyoxyethylene polyol content. Mixtures of the described polyol blends and polyurethanes are cured at elevated temperatures (75°–93° C.).

Still another polyol component for reaction with polyisocynates is known, for example, from EP-A-0 265 781 (=U.S. Pat. No. 5,028,684). It comprises a polyhydroxy compound of the molecular weight range from 62 to 499, which can have, for example, a functionality of between 2 and 6, a polyether-polyol of the molecular weight range from 500 to 999 and if appropriate a polyether component having at least two groups which are reactive towards isocyanate groups and a molecular weight of between 1000 and 10,000. The polyetherpolyol of the molecular weight range from 500 to 999 must contain here at least 30% by weight of ethylene oxide units present in a form incorporated in polyether chains. A polyurethane material having a modulus of elasticity in bending of more than 1800 N/mm$^2$ can be prepared by reaction of the polyol compositions described with a polyisocyanate of the diphenylmethane series. However, the reaction mixtures described here also cure at room temperature with a brittle phase. Moulds which have a temperature of at least more than 40° C., preferably between 50° and 70° C., are therefore employed to produce mouldings from the mixtures. This imposes increased requirements on the mould construction. A second considerable disadvantage is that considerable dimensional inaccuracies can occur because of the cooling of the moulding.

The object of the present invention is thus to provide a novel composition of several polyols which combine at the same time shelf life and the possibility of being able to produce the polyurethane mouldings having good mechanical properties when they are used as the polyol component for polyisocyanates of the diphenylmethane series. Specifically, the polyols in the polyol component should not tend to demix, even during storage for several weeks, and it should be possible to process the component with the polyisocyanates mentioned to give polyurethane mouldings having a modulus of elasticity in bending of more than 1000 N/mm$^2$, without reinforcing agents, such as fibre materials, being necessary here. Reaction mixtures comprising the polyol component to be proposed and polyisocyanates of the diphenylmethane series should furthermore already cure fully at temperatures in the range from 15° to 40° C., preferably at room temperature, so that no heated moulds are necessary. Furthermore, no brittle phase which can be detected in practice should occur during curing.

This object is achieved according to the invention by providing a specially selected polyol component, in particular for reaction with polyisocyanates of the diphenylmethane series, which comprises a) a polyol having a hydroxyl equivalent weight of up to 150 and a functionality of 4 to 8, b) a polyether-polyol having a hydroxyl equivalent weight of more than 1900 and a functionality of 2 to 4 and c) a polypropylene glycol having a functionality of 2 to 3 or a polytetrahydrofuran, each of which has a hydroxyl equivalent weight of 150 to 500, or a mixture of the two.

The polyol components according to the invention form a stable liquid phase which does not demix even during storage at room temperature for several weeks, for example lasting 3 to 6 months. Only certain solids which can be added to the components, for example fillers, can settle during storage, but can be stirred up again rapidly and easily. Furthermore, in these cases the processing properties do not suffer because of an inadequate homogeneity of the polyol components according to the invention. Polyurethane cast articles which have a modulus of elasticity in bending of at least above $1000N/mm^2$, and in some cases even far above $2000N/mm^2$, and which also have good values for the flexural impact and notched impact strength can be produced using the present polyol components together with polyisocyanates of the diphenylmethane series. The polyurethane material does not pass through a brittle phase, even during full curing at room temperature or only moderately elevated temperature, and mouldings of the material remain elastic throughout the entire full curing time.

Examples of constituent a) of the polyol components according to the invention are polyhydroxy compounds having 4 to 8 hydroxyl groups, for example erythritol or pentaerythritol; pentitols, such as arabitol, adonitol or xylitol; hexitols, such as sorbitol, mannitol or dulcitol, the most diverse types of sugars, for example sucrose, or sugar derivatives and starch derivatives. Compounds which can be used with particularly good results are low molecular weight reaction products of polyhydroxy compounds, such as those mentioned, with ethylene oxide and/or propylene oxide, and also the low molecular weight reaction products of other compounds which contain a sufficient number of groups which are capable of reacting with ethylene oxide and/or propylene oxide, for example of polyamines, such as, in particular, ammonia, ethylenediamine, 1,4-diaminobenzene, 2,4-diaminotoluene, 2,4'-diaminodiphenylmethane, 4,4'-diaminodiphenylmethane, 1-methyl-3,5-diethyl-2,4-diaminobenzene and/or 1-methyl-3,5-diethyl-2,6-diaminobenzene. Other suitable polyamines are listed in EP-A-0 265 781.

The lower limit for the hydroxyl equivalent weight of the polyols proposed as constituent a) is preferably 60. Particularly good results are achieved if the hydroxyl equivalent weight is greater than 70.

Reaction products of propylene oxide with amines, in particular with ethylenediamine, and polyhydroxy compounds, in particular sugars, are especially preferred as constituent a) of the polyol components according to the invention. Such products are also commercially obtainable, for example under the name Quadrol L ® and Lupranol 3321 ®.

The polyol components according to the invention can comprise, for example, 20 to 80% by weight, in particular 30 to 65% by weight, of constituent a).

Polyether-polyols are employed as constituent b) of the polyol components according to the invention. These components, which are customary in the art of polyurethanes (cf. Ullmanns Encyclopädie der technischen Chemie (Ullmann's Encyclopedia Industrial Chemistry), 4th Edition, Volume 19, Verlag Chemie GmbH, Weinheim 1980, pages 31-38 and pages 304, 305), can be obtained, for example, by reaction of an initiator with alkylene oxides, for example with ethylene oxide, propylene oxide or butylene oxide, or tetrahydrofuran. Initiators here are all the initiators which are usually suitable for the preparation of polyether-polyols having a functionality of 2 to 4, for example water, aliphatic, cycloaliphatic or aromatic polyhydroxy compounds having 2 to 4 hydroxyl groups, such as ethylene glycol, propylene glycol, butanediols, hexanediols, octanediols, dihydroxybenzenes or bisphenols, for example bisphenol A, trimethylolpropane or glycerol, erythritol or pentaerythritol, or corresponding polyamines, for example ethylenediamine or dianilines. Polyether-polyols based on ethylene oxide and/or propylene oxide are preferred, it being possible for the ethylene oxide/propylene oxide copolymers to be either random or block copolymers. The ratio of ethylene oxide to propylene oxide here can vary within wide limits. It is thus possible, for example, for only the terminal hydroxyl groups of the polyether-polyols to be reacted with ethylene oxide (end masking). However, the content of ethylene oxide units in the polyether-polyols suitable for constituent b) can also assume, for example, values up to 75 to 80% by weight. It will usually be advantageous if the polyether-polyols are at least masked on the ends with ethylene oxide. They then in fact contain terminal primary hydroxyl groups, which are more reactive than the secondary hydroxyl groups originating from the reaction with propylene oxide.

Polyether-polyols which contain solid organic fillers in a disperse distribution and partly bonded chemically to the polyether, such as polymer-polyols and polyurea-polyols, are also suitable as constituent b) of the polyol components according to the invention. As is known, polymer-polyols are polymer dispersions which are prepared by free radical polymerisation of suitable olefinic monomers, in particular acrylonitrile, styrene or mixtures of the two, in a polyether which serves as the graft base. Polyurea-polyols (PHD-polyethers) are a dispersion of polyureas which is obtainable by reaction of polyisocyanates with polyamines in the presence of polyether-polyols, partial chemical linking of the polyurea material to the polyether-polyols also taking place via the hydroxyl groups on the polyether chains. Polyols like those mentioned in this section are described in more detail, for example, in Becker/Braun "Kunststoffhandbuch (Plastics Handbook)", Volume 7 "Polyurethane", 2nd Edition, Carl Hanser Verlag, Munich Vienna (1983), page 76 and 77.

The hydroxyl equivalent weight of the polyether-polyols for b) should be more than 1900. The upper limit for the equivalent weight is preferably 3000. The amount of constituent b) is in general 3 to 40, preferably 5 to 30% by weight, based on the total polyol component.

Particularly preferred constituents b) are di- and trifunctional polyols, in particular polyols which are started with trimethylolpropane and are based on mixtures of ethylene oxide and propylene oxide. Polyetherpolyols, as those mentioned, are also commercially available.

Constituent c) is in general present in an amount of 10 to 30, in particular 10 to 20% by weight, based on the total polyol component.

Like the polyether-polyols already described above for constituent b), polypropylene glycols suitable for c) are accessible from di- and trifunctional initiators, for example those which have been mentioned above, and propylene oxide. They are known to the expert, as is their preparation, and are also commercially available in various forms.

This also applies to polytetrahydrofurans which are suitable according to the invention (commercial name, for example, Polymeg ®). The preparation and properties of such polytetrahydrofurans are described in more detail, for example, in Ullmanns Encyclopädie der technischen Chemie (Ullmann's Encyclopedia of Industrial Chemistry), 4th Edition, Volume 19, Verlag Chemie GmbH, Weinheim 1980, pages 297-299.

Polyol components which contain only polytetrahydrofuran as constituent c) are a particular embodiment of the invention. The use of polytetrahydrofuran by itself is generally preferred for mechanical preparation processes for polyurethane mouldings, because polytetrahydrofurans contain only primary hydroxyl groups and are therefore particularly reactive. The content of total polyol components in polytetrahydrofuran is then preferably 10 to 20% by weight. Nevertheless, polytetrahydrofurans readily tend to become solid in some polyol combinations at room temperature or only moderately elevated temperature. In these cases, it may also be advantageous to employ a mixture of polytetrahydrofuran and polypropylene glycol as constituent c), since polypropylene glycol can in many cases prevent the polytetrahydrofuran from crystallising out. The content of polypropylene glycol is then preferably above 25% by weight, for example in the range from 30 to 80% by weight, based on the mixture of polytetrahydrofuran and polypropylene glycol.

Polyol components in which constituent d) is exclusively polypropylene glycol are particularly suitable for the preparation of polyurethane mouldings by manual casting.

In another preferred embodiment of the polyol components according to the invention as a further constituent d), in addition to the constituents described above, a polyether-polyol having a functionality of 2-4 and a hydroxyl equivalent weight which is between that of the polyether-polyols employed as constituent b) and c) is also present. The hydroxyl equivalent weight of this polyether-polyol can thus be between 500 and 1900, but is preferably between 1000 and 1700. The statements made above in respect of the chemical composition for the polyether-polyols suitable as constituent b) also apply to these polyether-polyols, so that reference may merely be made here to that information. Constituent d) of the polyol components according to the invention is preferably present in an amount of up to 30% by weight, based on the total polyol component. 5 to 30% by weight of this constituent is particularly preferred.

The average hydroxyl equivalent weight of the total polyol components according to the invention should in general be between 150 and 260; values of 170 to 200 are preferred.

The polyol compositions can furthermore contain the customary amounts of the customary additives suitable for polyurethane technology. These are, for example, catalysts, both basic, such as tertiary amines, for example N-methylethanolamines, such as, in particular, N-methyldiethanolamine, triethanolamine, dibenzylmethylamine, diazabicylooctane etc., and acid, for example organotin compounds, such as dibutyltin laurate. Other additives are: foam suppressants, for example polysilicones, surface-active substances, such as castor oil, drying agents, for example molecular sieves based on zeolite, internal mould release agents, fillers, dyes, pigments, in particular titanium dioxide, flameproofing agents or blowing agents, in particular water. Other suitable additives are also mentioned in Becker/Braun "Kunststoffhandbuch (Plastics Handbook)" Volume 7 Polyurethane, 2nd Edition, Carl Hanser Verlag, Munich Vienna (1983). The total content of additives in the polyol components according to the invention can be, for example, 0 to 30% by weight.

Polyol components according to the invention can be used for manual and for mechanical production of polyurethane mouldings.

For this, a reaction mixture is first prepared from a polyisocyanate of the diphenylmethane series and at least one of the polyol components according to the invention, if appropriate with addition of auxiliaries and additives, such as, for example, those mentioned in the previous section.

The invention therefore also relates to a reaction mixture for the production of polyurethane mouldings, comprising a polyisocyanate of the diphenylmethane series and at least one of the polyol components described above in a total amount sufficient for curing of the mixture.

"Polyisocyanate of the diphenylmethane series" is understood here as meaning derivatives of diphenylmethane which contain on average at least two free isocyanate groups per molecule. Polyisocyanates which are liquid at ambient temperature or at only slightly elevated temperatures are in general preferred. Examples of suitable polyisocyanates are monomeric diisocyanatodiphenylmethane isomers (MDI), such as 4,4'-diisocyanatodiphenylmethane, 2,4'-diisocyanatodiphenylmethane or 2,2'-diisocyanatodiphenylmethane, or mixtures thereof, for example a mixture of 60% by weight of the 2,4'- and 40% by weight of the 4,4'-isomer. MDI polymer types, i.e. substances of the general formula $OCN\text{-}[C_6H_4]\text{-}CH_2\text{-}\{\text{-}[C_6H_3(NCO)]\text{-}CH_2\text{-}\}_n\text{-}[C_6H_4]\text{-}NCO$, in which n in general assumes values up to 8, are also suitable. If appropriate, the polymer types mentioned can also be employed as a mixture with monomers. The mixture can thus be, for example, a mixture having 30 to 70% by weight of dinuclear content (n=0), 15 to 40% by weight of trinuclear content (n=1) and if appropriate 15 to 30% by weight of a higher nuclear content (n>1). Such mixtures and similar mixtures are also commercially available. Urethanised diisocyanatodiphenylmethanes such as can be obtained, for example, by preliminary reaction of diisocyanatodiphenylmethane with low molecular weight di- or triols, carbodiimidised diisocyanatodiphenylmethanes or urethanised or carbodiimidised mixtures of diisocyanatodiphenylmethane derivatives, as those described above, are also particularly suitable. It is also possible to use diisocyanatodiphenylmethane derivatives having biuret or allophanate groups. A polyisocyanate component which comprises 5 to 20% by weight of carbodiimidised diisocyanatodiphenylmethane, 2 to 10% by weight of diisocyanatodiphenylmethane polymer types of the general formula OCN-[C$_6$H$_4$]-CH$_2$-{-[C$_6$H$_3$(NCO)]-CH$_2$-}$_n$-[C$_6$H$_4$]-NCO, in which n≧1, 70 to 93% by weight of a mixture of monomeric diisocyanatodiphenylmethane isomers, this mixture in turn consisting of 45 to 90% by weight of 4,4'-diisocyanatodiphenylmethane and 10 to 55% by weight of 2,4'- and 2,2'-diisocyanatodiphenylmethane, has particularly good properties. An example of a polyisocyanate component of the composition mentioned is a mixture of about 70% by weight of Desmodur ® CD and 30% by weight of Desmodur ® VL 50. Polyisocyanate components like this in fact have only an extremely weak intrinsic colouration (pale beige) and therefore allow mouldings to be produced in very pure colours, especially pale-coloured mouldings. Thus, for example, practically pure white mouldings can be obtained using a polyol component pigmented white. In order to prepare polyurethane material of a correspondingly pure colour with the aid of polyisocyanates of the diphenylmethane series, the purest possible 4,4'-diisocyanatodiphenylmethane was used to date as the polyol component. However, correspondingly pure 4,4'-diisocyanatodiphenylmethane tends to crystallise out at temperatures from 0° C. to room temperature and therefore cannot be stored, for example, at low temperatures. A polyisocyanate component of neutral colour, as described above, however, remains capable of flowing even at lower temperatures in the abovementioned range. The invention therefore also relates to a reaction mixture comprising the polyisocyanate component mentioned.

The reaction mixtures according to the invention comprise the polyisocyanate in the customary amount, in general corresponding to an isocyanate coefficient (quotient of the number of isocyanate groups and the number of groups capable of reacting with isocyanate groups in the reaction mixture multiplied by 100) of between 70 and 130, preferably corresponding to an isocyanate coefficient of between 90 and 110.

Another particularly good embodiment of the reaction mixtures according to the invention contains N-methyldiethanolamine as the catalyst. Since this compound in fact contains two hydroxyl groups, it participates in the polyurethane formation like a polyol and can therefore not evaporate (exude) out of the material during the life of the polyurethane.

The reaction mixtures in general have very low mixed viscosities, for example in the range from 500 to 1500 mPa.s.

The maximum possible processing times (pot lives) of the reaction mixtures are in general between 15 seconds and 180 minutes, depending on the polyisocyanate and polyol component used and the isocyanate coefficient of the mixture. A required maximum process time can be established particularly favourably and at a constant polyisocyanate component and constant mixing ratio of polyisocyanate to the total polyol content in the reaction mixture by using different amounts of different polyol components according to the invention, each of which allow a different processing time. A particularly favourable embodiment therefore concerns reaction mixtures according to the invention which contain a polyisocyanate of the diphenylmethane series and at least two different polyol components of the type described above in a total amount sufficient for curing of the mixture, each of which when used by itself with the polyisocyanate employed in a mixture of the same isocyanate coefficient allows a different maximum processing time, the reaction mixture having a processing time which is between those which can be achieved with the individual polyol components. In some cases, it is advantageous here if the various polyol components are coloured differently, since the maximum possible processing time of the mixture can then in general be determined particularly easily from the resulting mixed colour of the reaction mixture.

As is customary, reaction mixtures having a relatively long processing time are particularly suitable for manual preparation and processing, while mixtures having a short pot life are advantageously both mixed mechanically and further processed to mouldings mechanically by the process techniques which are known per se and are described, for example, in Ullmanns Encyclopädie der technischen Chemie (Ullmann's Encyclopedia of Industrial Chemistry), 4th Edition, Volume 19, Verlag Chemie GmbH, Weinheim 1980, page 316 et seq., such as the reaction injection moulding technique, the vacuum casting technique and others.

If desired, the polyol components according to the invention can also be intermediately stored for a relatively long time before preparation of the reaction mixtures without the liquid phase demixing, and they can therefore be employed without it first being necessary to form a homogeneous emulsion of the polyol constituents of the components again.

The invention therefore also relates to a process for the production of polyurethane mouldings, in which a first component based on polyisocyanates of the diphenylmethane series is mixed with a total amount, sufficient for curing of the mixture, of at least one of the polyol components described above, which has been intermediately stored beforehand if appropriate, and if appropriate other additives customary in polyurethane technology to give a reaction mixture like those described, and the resulting mixture is moulded and fuly cured to give mouldings.

Curing is in general carried out here at a temperature of between 15° and 40° C., particularly preferably at about room temperature, i.e., also without heating of the mould employed. The polyol components described above are preferably used here with constituent d).

Finally, the invention furthermore relates to polyurethane mouldings obtainable from the reaction mixtures described above.

Polyurethane mouldings which contain no free plasticiser are particularly preferred. The term "free plasticiser" is understood as meaning conventional plasticiser compounds, i.e., those which contain no functional groups which participate in the reaction of the polyisocyanate with the polyol components. Plasticisers of this type, for example adipic acid esters and dibutyl or dioctyl phthalate, which have often been added to the polyol components for homogenisation and for increasing the elasticity of the polyurethane material, have the disadvantage that they exude slowly out of the material, which leads to a constantly increasing embrittlement of the polyurethane material during its life. Because of the special composition of the polyol components according to the invention, however, such conventional plasticisers are as a rule unnecessary, so that mouldings according to the invention scarcely change in their elasticity properties throughout their life.

Polyurethane mouldings of varying sizes can be produced particularly easily in accordance with the invention. A particular advantage of the present invention is that the pot lives of the reaction mixtures according to the invention can be controlled particularly easily and varied within a wide range. The larger a mould, in fact, the longer also in general the filling time which it requires. However, the pot life of the reaction mixture used must of course be at least somewhat longer than the filling time of the mould used. If, however, stocks are held of a polyisocyanate component and at least two polyol components which result in different pot lives with the polyisocyanate, reaction mixtures to suit the particular requirements can also be prepared mechanically quickly and in a simple manner, for example in the manner described above, without changes in the properties of the polyurethane material prepared therefrom having to be accepted because of a changed mixing ratio of isocyanate to total polyol.

EXAMPLE 1

A polyol component is prepared from 10 parts by weight of a mixture of a polypropylene glycol started with sucrose and a polypropylene glycol started with glycerol, having an average hydroxyl equivalent weight of 140 (corresponding to CAS No. 56731-02-3) as constituent a) and the parts by weight shown in Table 1 of a polyalkylene glycol started with trimethylolpropane, which comprises ethylene oxide units and propylene oxide units and has a hydroxyl equivalent weight of 2150 (CAS No. 52624-57-4), as constituent b) and a polypropylene glycol having a hydroxyl equivalent weight of 200 and a hydroxyl functionality of 2 (CAS No. 25322-69-4) as constituent c). After 4 weeks, the particular degree of homogeneity stated in Table 1 for the polyol components of the various compositions can be determined:

TABLE 1

| Parts by weight of constituent b) | Parts by weight of polypropylene glycol | | | | | | | | | | | |
|---|---|---|---|---|---|---|---|---|---|---|---|---|
| | — | | 0.5 | | 1.0 | | 1.5 | | 2.0 | | 2.5 | |
| | 50° C. | RT | 50° C. | RT | 50° C. | RT | 50° C. | RT | 50° C. | RT | 50° C. | RT |
| 0.5 | + | ∘ | + | ∘ | + | ∘ | + | ∘ | + | ∘ | + | + |
| 1.0 | − | − | − | − | + | ∘ | + | ∘ | + | ∘ | + | + |
| 1.5 | − | − | − | − | − | − | + | ∘ | + | ∘ | + | + |
| 2.0 | − | − | − | − | − | − | + | ∘ | + | ∘ | + | + |
| 2.5 | − | − | − | − | − | − | + | ∘ | + | ∘ | + | + |
| 3.0 | − | − | − | − | − | − | − | ∘ | + | − | + | + |

− Phase separation/ ∘ cloudy without phase separation/ + clear without phase separation

EXAMPLE 2

A polyol component is prepared by mixing the following constituents:

| % by weight | Component/corresponds to constituent | CAS No. |
|---|---|---|
| 62.26 | A mixture of a polypropylene glycol started with sucrose and a polypropylene glycol started with glycerol having an average hydroxyl equivalent weight of 140 (Lupranol ®3321)/ | a) 56731-02-3 |
| 5.11 | a polyalkylene glycol which is started with trimethylolpropane and comprises ethylene oxide units and propylene oxide units, hydroxyl equivalent weight 2150 (Lupranol ®2042) | |
| 4.00 | polytetrahydrofuran having an equivalent weight of 325 and | 25190-06-1 |
| 9.72 | polypropylene glycol from Example 1/ | c) 25322-69-4 |
| 8.37 | a polyalkylene glycol which is started with glycerol and comprises ethylene oxide units and propylene oxide units, hydroxyl equivalent weight 1340 (Lupranol ®2000)/ | d) 9082-00-4 |
| 8.00 | Polysorb ®F 690-003/drying agent | 1344-00-9 |
| 0.96 | N-methyldiethanolamine/catalyst | 105-59-9 |
| 0.30 | foam suppressant | 63148-53-8 |
| 1.28 | titanium dioxide | 13463-67-7 |

The mixture is white liquid having a density of 1.08 g/ml (20° C.) and a viscosity of 2240 mPa.s (25° C.). This can be stored at room temperature for at least six months without several liquid phases forming.

EXAMPLE 3

Another polyol component is prepared by mixing the following constituents:

| % by weight | Component/corresponds to constituent | CAS No. |
|---|---|---|
| 31.7 | Tetrakis(2-hydroxypropyl)-ethylenediamine (Quadrol ®L)/ | a) 102-60-3 |
| 28.0 | a polyalkylene glycol which is started with trimethylolpropane and comprises ethylene oxide units and propylene oxide units, hydroxyl equivalent weight 2150 (Lupranol ®2042)/ | b) 52624-57-4 |
| 13.8 | polytetrahydrofuran having an equivalent weight of 325 | c) 25190-06-1 |
| 15.6 | a polyalkylene glycol which is started with glycerol and comprises ethylene oxide units and propylene oxide units, hydroxyl equivalent weight 1340 (Lupranol ®2000)/ | d) 9082-00-2 |
| 6.6 | Polysorb ®F 690-003/drying agent | 1344-00-9 |
| 2.9 | N-methyldiethanolamine/catalyst | 105-59-9 |
| 0.6 | foam suppressant | 63148-53-8 |
| 0.8 | black dye | |

The mixture is a black liquid having a density of 1.01–1.03 g/ml (25° C.) and a viscosity of 1550–1750 mPa.s (25° C.). It has a flash point of 172° C. (DIN 51758) and can also be stored at room temperature for some months without several liquid phases forming.

EXAMPLE 4

A polyisocyanate component is prepared from 70% by weight of Desmodur ® CD (partly carbodiimidised diisocyanatodiphenylmethane) and 30% by weight of Desmodur ® VL 50 (technical grade diisocyanatodiphenylmethane). This isocyanate component has a density of 1.22 g/ml and a viscosity of 30 mPa.s.

It is mixed manually with the polyol component from Example 2 in a weight ratio of 77 to 100. The resulting mixture has a pot life of 25 minutes and is therefore particularly suitable for manual casting. Curing of the mixture gives a polyurethane material having the properties shown in Table 2.

EXAMPLE 5

Crude technical grade diisocyanatodiphenylmethane (mixture) as the polyisocyanate component is mixed mechanically with the polyol component from Example 3 in a weight ratio of 80 to 100. The resulting mixture has a pot life of 40 seconds and is processed to mouldings by the reaction injection moulding process. This gives a polyurethane material having the properties shown in Table 2.

Another portion of the reaction mixture is cast into several strip-like mouldings having dimensions of 100×40×1 millimeters. After about 5 minutes at room temperature, the mould material has a Shore D hardness of about 20 and can just be removed from the mould. The material is tested for any brittleness which may occur during the curing phase by first bending the first one of the strips through 90° approximately in the centre immediately after removal from the mould, the bending axis running parallel to the 40 millimeter wide side of the strip. The other strips are then allowed to cure further at room temperature in the removed state. During the subsequent hour, the test described above is carried out with another one of the strips in each case after a further 5 minutes. Fracture occurs in none of the cases.

EXAMPLE 6

The polyisocyanate component used in Example 4 is mixed mechanically with the polyol component from Example 3 in a weight ratio of 77 to 100. The resulting mixture has a pot life of 55 seconds and is converted to mouldings by the reaction injection moulding process as in Example 5, a polyurethane material having the properties shown in Table 2 being obtained.

TABLE 2

| | | Product from Example | | |
|---|---|---|---|---|
| | | 4 | 5 | 6 |
| Shore D hardness after curing for | 24 hours/RT* | 75,5 | 73 | 76 |
| | 3 days/RT | | 74 | |
| | 14 hours/80° C. | 82 | 78.5 | 79.5 |
| Tensile test: (DIN 53455) | **σ-max [N/mm²] | 56 | 39 | 37 |
| | ε at fracture [%] | 12 | 9 | 26 |
| | E modulus [N/mm²] | 2187 | 1358 | 1354 |
| Bending test: (DIN 53457) | **σ-max [N/mm²] | 99 | 59 | 66 |
| | ε at fracture [%] | no fracture | no fracture | no fracture |
| | E modulus [N/mm²] | 2383 | 1276 | 1434 |
| **Flexural impact test in accordance with ISO 179/2D [kJ/m²] | | 38 | 32 | 34 |
| **Notched impact test in accordance with ISO 179/2C [kJ/m²] | | 4,3 | 1,8 | 8,3 |

*Room temperature
**after curing for 14 hours/80° C.

No brittle phase during curing is also to be found in any of the reaction mixtures used in Examples 4 and 6.

EXAMPLE 7

A polyol component is prepared by mixing the following constituents

| % by weight | Component/corresponds to constituent | CAS No. |
|---|---|---|
| 62.26 | a mixture of a polypropylene glycol started with sucrose and a polypropylene glycol started with glycerol having an average hydroxyl equivalent weight of 140 (Lupranol ®3321)/ | a) 56731-02-3 |
| 6 | a polyalkylene glycol which is started with trimethylolpropane and comprises ethylene oxide units and propylene oxide units, hydroxyl equivalent weight 2150 (Lupranol ®2042)/ | b) 52624-57-4 |
| 13.7 | polypropylene glycol having a hydroxyl equivalent weight of 200 (functionality 2)/ | c) |
| 8.37 | a polyalkylene glycol which is started with glycerol and comprises ethylene oxide units and propylene oxide units, hydroxyl equivalent weight 1340 (Lupranol ®2000)/ | d) 9082-00-2 |
| 8.00 | Polysorb ®F 690-003/drying agent | 1344-00-9 |
| 0.96 | N-methyldiethanolamine/ catalyst | 105-59-9 |
| 0.30 | foam suppressant | 63148-53-8 |

The polyol component is mixed manually with a polyisocyanate component such as has been described in Example 4 in a weight ratio of 100 to 80. The resulting mixture has a pot life of 32 minutes and is therefore particularly suitable for manual casting. A polyurethane material having the properties shown in Table 3 is obtained by curing the mixture.

EXAMPLE 8

A polyol component is prepared by mixing the following constituents

| % by weight | Component/corresponds to constituent | CAS No. |
|---|---|---|
| 62.26 | A mixture of polypropylene glycol started with sucrose and a polypropylene glycol started with glycerol having an average hydroxyl equivalent weight of 140 (Lupranol ®3321)/ | a) 56731-02-3 |
| 6 | SAN polymer-polyol having a hydroxyl equivalent weight of 2000, molecular weight 4000 (Polyurax ®RP 1464)/ | b) |
| 13.72 | polypropylene glycol having a hydroxyl equivalent weight of 200 (functionality 2)/ | c) |

-continued

| % by weight | Component/corresponds to constituent | CAS No. |
|---|---|---|
| 8.37 | a polyalkylene glycol which is started with glycerol and comprises ethylene oxide units and propylene oxide units, hydroxyl equivalent weight 1340 (Lupranol ®2000)/ | d) 9082-00-2 |
| 8.00 | Polysort ®F 690-003/drying agent | 1344-00-9 |
| 0.96 | N-methyldiethanolamine/ catalyst | 105-59-9 |
| 0.30 | foam suppressant | 63148-53-8 |

The polyol component is mixed manually with a polyisocyanate component such as has been described in Example 4 in a weight ratio of 100 to 80. The resulting mixture has a pot life of 30 minutes. A polyurethane material having the properties shown in Table 3 is obtained by curing the mixture.

EXAMPLE 9

A polyol component is prepared by mixing the following constituents

| % by weight | Component/corresponds to constituent | CAS No. |
|---|---|---|
| 62.26 | a mixture of a polypropylene glycol started with sucrose and a polypropylene glycol started with glycerol having an average hydroxyl equivalent weight of 140 (Lupranol ®3321)/ | a) 56731-02-3 |
| 6 | polyurethane dispersion-polyol having a hydroxyl equivalent weight of 2000, molecular weight 6000 (Desmophen ®1920 D)/ | b) |
| 13.72 | polypropylene glycol having a hydroxyl equivalent weight of 200 (functionality 2)/ | c) |
| 8.37 | a polyalkylene glycol which is started with glycerol and comprises ethylene oxide units and propylene oxide units, hydroxyl equivalent weight 1340 (Lupranol ®2000)/ | d) 9082-00-2 |
| 8.00 | Polysorb ®F 690-003/drying agent | 1344-00-9 |
| 0.96 | N-methyldiethanolamine/ catalyst | 105-59-9 |
| 0.30 | foam suppressant | 63148-53-8 |

The polyol component is mixed manually with a polyisocyanate component such as has been described in Example 4 in a weight ratio of 100 to 80. The resulting mixture also has a pot life of 30 minutes. A polyurethane material having the properties shown in Table 3 is obtained by curing the mixture.

TABLE 3

| | | Product from Example | | |
|---|---|---|---|---|
| | | 7 | 8 | 9 |
| Shore D hardness after curing for | 24 hours/RT* | 78 | 79 | 79 |
| | 14 hours/80° C. | 84.5 | 85 | 85 |
| Tensile test: (DIN 53455) | **σ-max [N/mm²] | 62 | 67 | 67 |
| | ε at fracture [%] | 16 | 12 | 16 |
| | E modulus [N/mm²] | 2586 | 2806 | 2781 |
| Flexural test: (DIN 53457) | **σ-max [N/mm²] | 107 | 117 | 113 |
| | ε at fracture | 9.5 | 10 | 10 |

TABLE 3-continued

| | Product from Example | | |
|---|---|---|---|
| | 7 | 8 | 9 |
| E modulus [N/mm²] | 2713 | 2737 | 2791 |

*Room temperature
**after curing for 14 hours/80° C.

What is claimed is:

1. A polyol component for the production of polyurethane moldings which comprises
   a) a polyol having a hydroxyl equivalent weight of up to 150 and functionality of 4 to 8,
   b) a polyether-polyol having a hydroxyl equivalent weight of more than 1900 and a functionality of 2 to 4 and
   c) a polypropylene polyol having a functionality of 2 to 3, a polyetetrahydrofuran, each of which has a hydroxyl equivalent weight of 150 to 500, or a mixture of the two.

2. A polyol component according to claim 1, wherein constituent c) is exclusively polytetrahydrofuran.

3. A polyol component according to claim 1, wherein constituent c) is exclusively polypropylene glycol.

4. A polyol component according to claim 1, wherein, as a further constituent d), a polyether-polyol having a functionality of 2-4 and a hydroxyl equivalent weight between those of the polyether-polyols employed as constituents b) and c) is also present.

5. A reaction mixture for the production of a polyurethane moulding, comprising a polyisocyanate of the diphenylmethane series and at least one polyol component according to claim 1 in a total amount sufficient for curing of the mixture.

6. A reaction mixture according to claim 5, which comprises a polyisocyanate component which comprises 5 to 20% by weight of a carbodiimidised diisocyanatodiphenylmethane, 2 to 10% by weight of a diisocyanatodiphenylmethane polymer type of the general formula OCN-[C₆H₄]-CH₂-{-[C₆H₃(NCO)]-CH₂-}ₙ-[C₆H₄]-NCO, in which n≧1, and 70 to 93% by weight of a mixture of monomeric diisocyanatodiphenylmethane isomers, this mixture in turn consisting of 45 to 90% by weight of 4,4'-diisocyanatodiphenylmethane and 10 to 55% by weight of 2,4'- and 2,2'-diisocyanatodiphenylmethane.

7. A reaction mixture according to claim 5, wherein the catalyst is N-methyldiethanolamine.

8. A reaction mixture according to claim 5, which comprises at least two different polyol components according to claims 1, each of which when used alone, with the polyisocyanate employed, in a mixture of the same isocyanate coefficient allows different maximum processing times, the reaction mixture having a processing time which is between those which can be achieved with the individual polyol components.

9. A reaction mixture according to claim 8, in which the different polyol components are coloured differently.

10. A process for the production of a polyurethane molding, in which a component based on a polyisocyanate of the diphenylmethane series is mixed with a total amount sufficient for curing the mixture of at least one of the polyol components according to claim 1, which has been optionally intermediately stored beforehand, and which optionally contains other additives customary in polyurethane technology to give a reaction mixture according to claim 5, and the resulting mixture is moulded and cured to give the moulding.

11. The process according to claim 10, in which the curing is carried out at about room temperature and without heating the mould employed.

12. A polyurethane moulding obtainable from a reaction mixture according to claim 5.

13. A polyurethane moulding according to claim 12, which contains no free plasticiser.

* * * * *